(No Model.)

P. F. BRYCE.

BREAD MAKING MACHINE.

No. 255,411.  Patented Mar. 28, 1882.

WITNESSES.
James B. Lezius.
R. P. Daggett.

INVENTOR.
Peter F. Bryce,
PER C. Bradford.
ATTORNEY.

N. PETERS, Photo-Lithographer, Washington, D. C.

UNITED STATES PATENT OFFICE.

PETER F. BRYCE, OF INDIANAPOLIS, INDIANA.

BREAD-MAKING MACHINE.

SPECIFICATION forming part of Letters Patent No. 255,411, dated March 28, 1882.

Application filed March 8, 1881. (No model.)

*To all whom it may concern:*

Be it known that I, PETER F. BRYCE, of the city of Indianapolis, county of Marion, and State of Indiana, have invented certain new and useful Improvements in Bread-Making Machines, of which the following is a specification.

The principal object of my said invention is to produce a machine for forming bread into loaves in the process of making, which shall press rather than cut the dough apart, to the end that the fibers or grain thereof shall be preserved continuous, or nearly so, about the outside of the completed loaf. This object is accomplished by using in the cutting-machine knives which are rounded instead of sharp on the edge, or, rather, thick, blunt, round-pointed wedges instead of the ordinary sharp knives, as will hereinafter be more particularly set forth.

Figure 1:
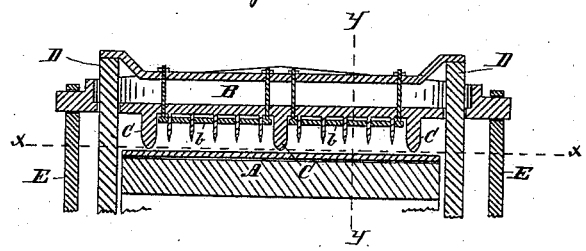
Figure 2:
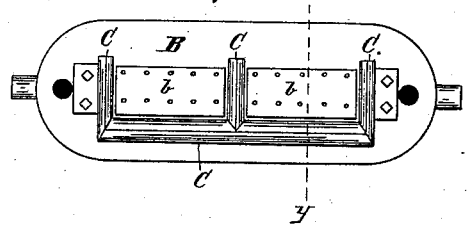
Figure 3:
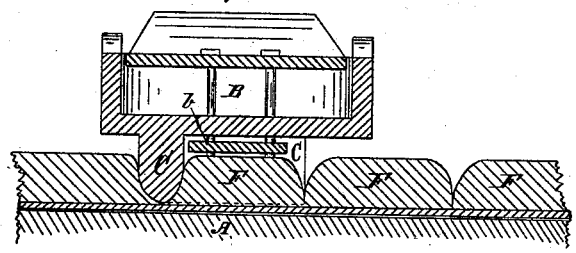
Figure 4:
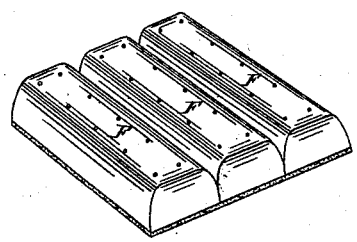

Referring to the accompanying drawings, which are made a part hereof, Figure 1 is a vertical section through one of my improved cutters and surrounding parts. Fig. 2 is an under side plan thereof, as seen when looking upwardly from the dotted line *x x*. Fig. 3 is a transverse vertical section thereof while in the operation of separating the dough into loaves, as seen when looking to the right from the dotted line *y y* and on an enlarged scale. Fig. 4 is a perspective view of loaves or sections of dough when formed by the use of my improved machine, and Fig. 5 a similar view when the same are formed with ordinary sharp knives.

In said drawings the portions marked A represent the bed of a machine for forming dough into loaves; B, the cutter-head, carrying my improved cutters C and the clearers *b*; D D, standards or slides on which the head B moves; E E, pitmen which operate the head B; F, the loaves which are formed by my improved machine, and G the loaves which are formed by ordinary sharp knives.

Figure 5:
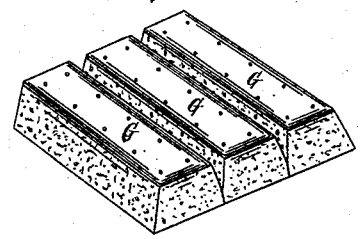

It is of importance in bread-making that the fiber of the dough be as nearly continuous as possible on the outside, so that the loaves may appear white and flakey where they break apart, and also to prevent them from drying out too rapidly. In making bread by hand conformity to these conditions is easy. In making bread by machinery, however, it has been the custom to cut the dough into loaves with a sharp knife or knives, thus leaving the ends and sides without the fibrous covering and with openings therein, as shown in Fig. 5, which causes them to adhere together badly in baking and to leave rough edges on the loaves of bread when they are broken apart. By the use of my invention this difficulty is entirely avoided, as the round edge of my cutter acts in such manner as to press the dough apart in the form shown by Fig. 3 and leave the loaf covered with fiber or grain of the dough, except at the extreme edge, as shown in Fig. 4.

The loaves may be panned for baking, after being formed from the dough, either in the position in which they are cut or on edge. In either of these cases, however, the advantage is equal, for the top should be protected by the fiber or grain of the dough equally with the sides, to prevent the gases which are generated in the process of raising from escaping too freely, and to leave a smooth crust-surface. It has usually been my custom to pan the loaves on one of the cut edges. By this means I bring those portions of the loaves together which are entirely free from roughness of any kind, and thus insure the utmost possible smoothness where the loaves break apart after they are baked, while of the slightly-roughened edges one is in contact with the pan and the other is exposed to the air, where it soon crusts over.

Having thus fully described my said invention, what I claim as new, and desire to secure by Letters Patent, is—

In a machine for forming loaves of bread, the combination of a vertically-reciprocating head carrying loaf-separating knives, the lower ends of which are rounded for the purpose of separating the loaves, a bed for the dough to rest upon, guides for the reciprocating head to move upon, and a series of clearers for removing the loaves from the head, all substantially as described.

In witness whereof I have hereunto set my hand and seal, at Indianapolis, Indiana, this 26th day of February, A. D. 1881.

PETER F. BRYCE. [L. S.]

Witnesses:
 C. BRADFORD,
 JAMES B. LIZIUS.